(No Model.) 2 Sheets—Sheet 2.
W. DOERING.
VEGETABLE CUTTER.
No. 375,806. Patented Jan. 3, 1888.
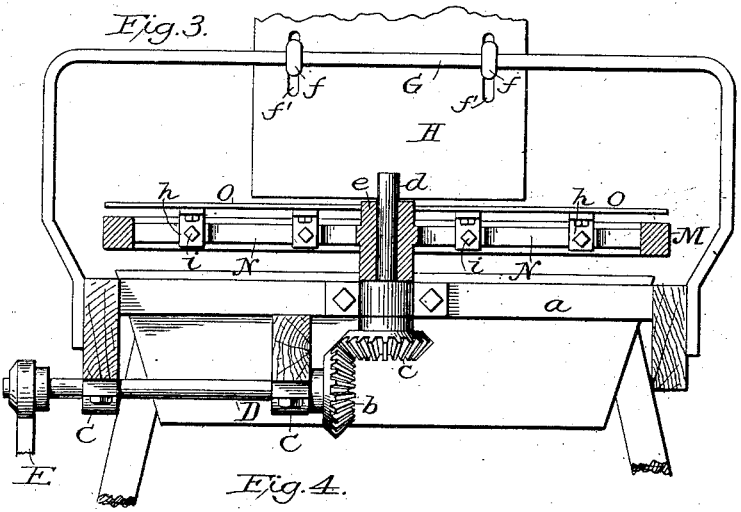
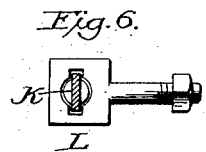
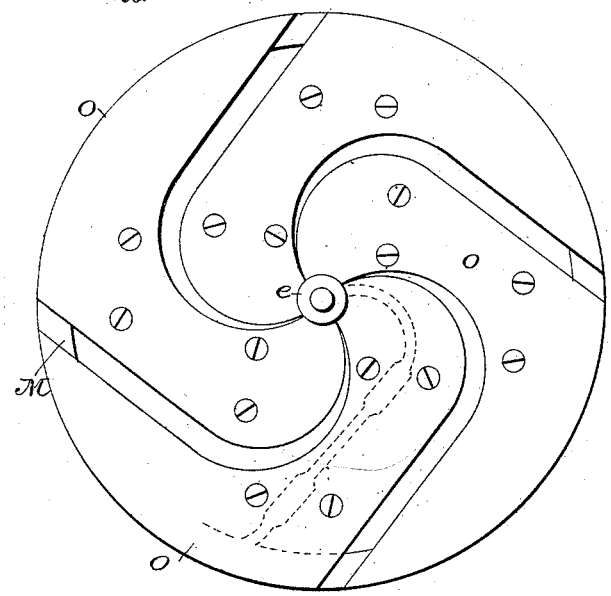
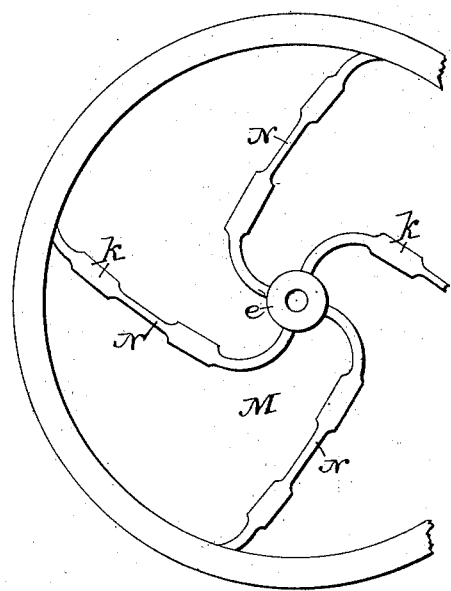
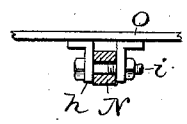
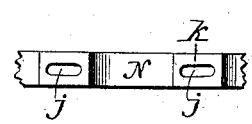
Witnesses:
James P. DuHamel
Walter H. Dodge
William Doering
Inventor,
by Dodge & Son,
his Attys.

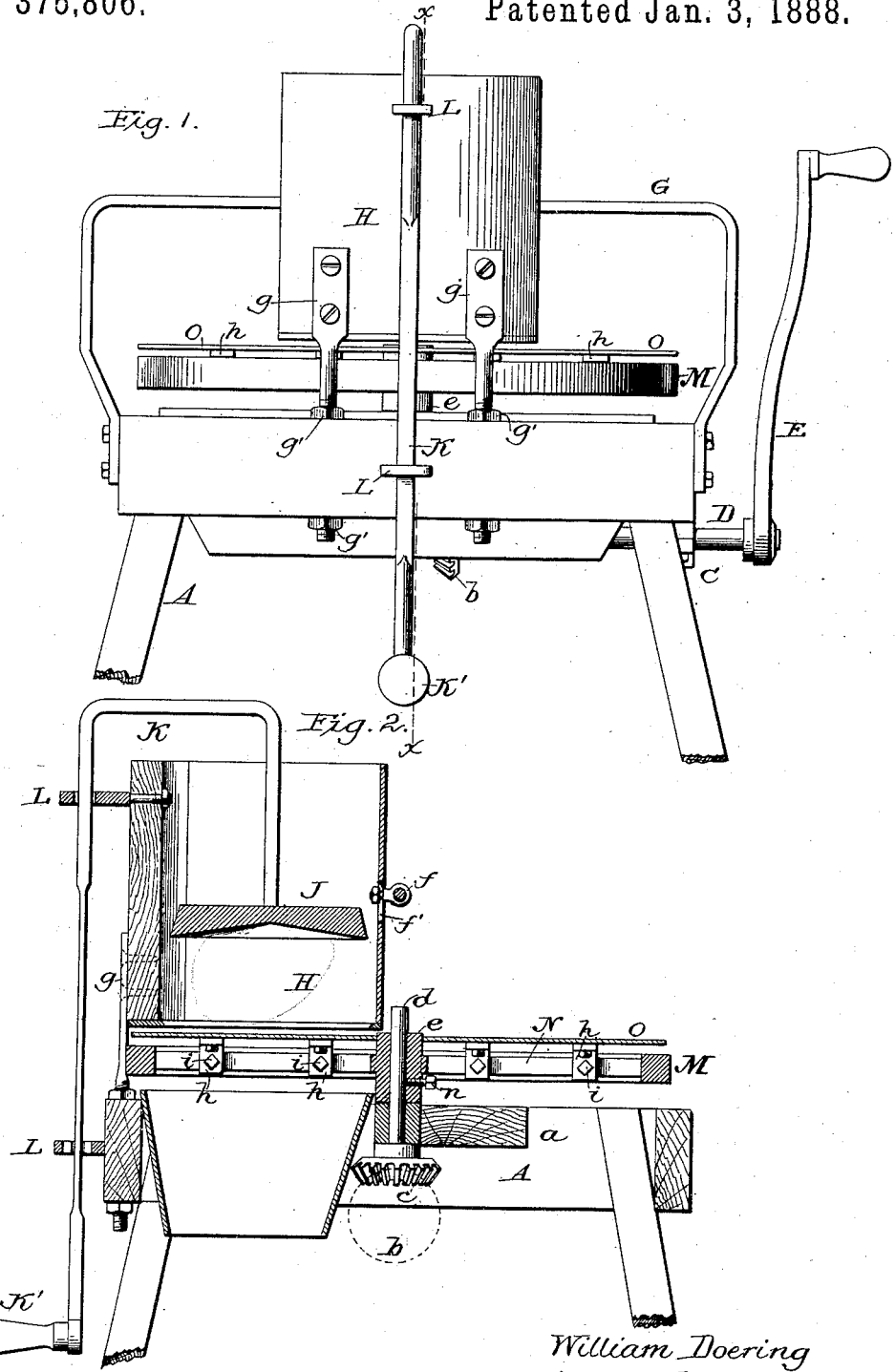

UNITED STATES PATENT OFFICE.

WILLIAM DOERING, OF KANSAS CITY, MISSOURI.

VEGETABLE-CUTTER.

SPECIFICATION forming part of Letters Patent No. 375,806, dated January 3, 1888.

Application filed June 12, 1886. Serial No. 204,999. (No model.)

*To all whom it may concern:*

Be it known that I, WILLIAM DOERING, of Kansas City, in the county of Jackson and State of Missouri, have invented certain new and useful Improvements in Vegetable-Cutters, of which the following is a specification.

My invention relates to vegetable cutting or slicing machines; and the improvements consist in various features and details of construction, hereinafter explained, whereby the machine is made simple and cheap.

In the accompanying drawings, Figure 1 is a front view of my improved cutter; Fig. 2, a section on the line $x\ x$ of Fig. 1; Fig. 3, a sectional view showing the arrangement of gearing by which the machine is operated; Fig. 4, a top plan view of the rotating knives or cutters; Fig. 5, a view of the frame upon which the knives are secured; Fig. 6, an enlarged view of the follower and follower-rod, and Figs. 7 and 8 detail views.

A indicates the framing of the machine, provided with suitable cross bars or beams, $a$, at its top for supporting the mechanism.

C C indicate bearings for a shaft, D, which carries a gear-wheel, $b$, at its inner end, and is provided at its outer end with a handle, E, by which to turn it. Gear-wheel $b$ meshes with and gives motion to a second gear-wheel, $c$, secured on an upright shaft, $d$, which is supported in a suitable bearing in frame A.

F indicates a cutting wheel or disk, the hub $e$ of which is bored to fit and is keyed or otherwise secured upon the upper end of shaft $d$.
Supported over the cutting-wheel, by means of a yoke or cross-rod, G, or like means, is a box or receptacle, H, which receives the vegetable to be cut, the rear or outer wall of said box being curved to conform more closely to the contour of the wheel or disk, and to bring the vegetable wholly within the circumference thereof. Cross rod or yoke G (the ends of which are secured to frame A, as shown in Fig. 1) is secured to box H by means of bolts $f$ sliding in slots $f'$ in said box, for the purpose of permitting vertical adjustment of box H on cross-rod G. Box H is further supported by means of adjustable bolts $g\ g$, one end of each of which is secured to the box, near the bottom thereof, the other end being screw-threaded and passing through a hole in a beam of the frame A, as shown in Fig. 1. Nuts $g'\ g'$, screwed upon the bolts both above and below said beam, as shown in Fig. 1, serve to secure the bolts to the beam, and also permit vertical adjustment of the bolts and the box H.

J indicates a follower for pressing upon the vegetable being cut, its under face being made concave, as shown in Fig. 6, to conform more closely to the shape of the vegetable and to center the same under the follower.

K indicates the follower-rod to which the follower is secured, and which extends from the follower up through the box H, laterally over the top thereof, and down to a point within easy reach of the operator, as shown in Fig. 2, where it is furnished with a handle, K', by which to operate it. Rod K is made cylindrical in its upper and lower portions throughout, and made flat or angular between said cylindrical portions, for a purpose presently explained.

The rod K passes through and is guided and sustained by eyebolts L, one of which has its eye formed with lateral enlargements, as shown in Fig. 6, to receive the flattened or angular portion of the rod. The purpose of this construction is to allow the follower to be raised up and turned away from the box H when it is desired to put vegetables therein, but to prevent such turning aside when the follower is lowered to bear upon the vegetable in the box. The flattened or angular portion is always within the angular eye while the follower is in working position, and the lower cylindrical portion is brought into said eye by raising the follower and rod, as above explained.

M indicates a wheel or disk having arms or spokes N, extending from the hub $e$ to the outer rim, as shown in Fig. 5. The arms or spokes N are made wider or thicker at some parts than at others, as shown at $k$ in Fig. 5.

Knives O, made in the form shown in Fig. 4, and furnished on their under faces with perforated ears $h$, separated to pass down on opposite sides of the arms N, are secured upon the arms by means of bolts, screws, or pins $i$ $i$, passing through the arms N and ears $h$, as in Fig. 7. The holes $j$, made in the arms N to receive the bolts or pins $i$, are elongated, as in Fig. 8, to permit adjustment of the blades.

It is of course understood that there are means for securing the knives at each part $k$ of arms N, several knives being comprised in the revolving cutter, as shown in Fig. 4.

The revolving cutter is made adjustable vertically on its shaft, and may be retained in any desired position by means of a set-screw, $n$, as shown in Fig. 2.

The machine being thus constructed operates as follows: The vegetable to be cut is placed in the box H, the lower edge of which is furnished with a metal frame having its inner edge sharpened for the revolving cutter-blades to work against, or in conjunction with, in case of tough skin or particles being caught. The follower-rod being raised to bring its round portion into the elongated eye, and the follower being turned aside, the vegetable to be sliced is put into box H, the rod is then turned to bring the follower over the box H, and is then lowered, thus bringing the flattened portion of said rod in the elongated eye of bolt L, securing it against turning, and at the same time bringing the concave follower down upon the vegetable. After these preparations are made, the handle or crank E being turned, causes gear $b$ to revolve, motion being thus imparted to gear $c$, which in turn revolves the revolving cutter, as previously explained, the vegetable being pressed upon the cutter by forcing down the handle K'.

This construction forms a cheap and simple machine, not easily thrown out of adjustment, and adapted for general use.

I am aware that it is old to provide vegetable-cutters with adjustable hoppers, and also with adjustable knives, and to these features, broadly, I lay no claim.

Having thus described my invention, what I claim is—

1. In a vegetable-slicer, the combination, with a supporting-frame, of a rotary slicing wheel or cutter, and box or receptacle placed over said wheel, a follower adapted to enter said box, a supporting-rod for the follower, made cylindrical through a portion of its length and angular in other portions, and guides or eye-bolts for sustaining the rod, one having an elongated eye to receive the angular part of the rod.

2. In combination with frame A, wheel or cutter F, and gearing for rotating the same, cross-rod G, box H, provided with slots $f'$, clamping-bolts $f$, and upright bolts $g$ $g$, passing through frame A and provided with nuts.

3. In combination with wheel F, having arms N, the latter provided with elongated horizontal slots $j$, knives O, provided with ears $h$, and bolts $i$, passing through the ears and slots, substantially as shown, whereby the blades may be adjusted horizontally to increase or decrease the thickness of the cut.

WILLIAM DOERING.

Witnesses:
L. C. HERRING,
E. L. RIVERS.